United States Patent
Iizaka et al.

(10) Patent No.: US 10,210,495 B2
(45) Date of Patent: Feb. 19, 2019

(54) IMAGE RECOGNITION SYSTEM THAT PERFORMS CODE DETECTION AND IMAGE RECOGNITION CONCURRENTLY

(71) Applicant: TOSHIBA TEC KABUSHIKI KAISHA, Tokyo (JP)

(72) Inventors: Hitoshi Iizaka, Fuji Shizuoka (JP); Hidehiro Naito, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/240,791

(22) Filed: Aug. 18, 2016

(65) Prior Publication Data

US 2017/0076270 A1    Mar. 16, 2017

(30) Foreign Application Priority Data

Sep. 16, 2015 (JP) .................................. 2015-183052

(51) Int. Cl.
*G06Q 20/20* (2012.01)
*G07G 1/00* (2006.01)
(Continued)

(52) U.S. Cl.
CPC ......... *G06Q 20/208* (2013.01); *G06K 7/1408* (2013.01); *G06K 7/1447* (2013.01);
(Continued)

(58) Field of Classification Search
None
See application file for complete search history.

(56) References Cited

U.S. PATENT DOCUMENTS

| | | | |
|---|---|---|---|
| 2011/0211760 A1 | 9/2011 | Boncyk et al. | |
| 2013/0193210 A1* | 8/2013 | Iizaka; Hitoshi | .... G07G 1/0045 235/454 |
| 2014/0153786 A1 | 6/2014 | Takeno et al. | |

FOREIGN PATENT DOCUMENTS

| | | |
|---|---|---|
| JP | 2013-89084 A | 5/2013 |
| JP | 2013-156938 A | 8/2013 |
| JP | 2013178722 A | 9/2013 |

OTHER PUBLICATIONS

Keiji Yanai, "The Current State and Future Directions on Generic Object Recognition", Nov. 2007, Journal of Information Processing Society, vol. 48 No. SIG 16 (CVIM 19), pp. 1-24.

(Continued)

*Primary Examiner* — Kristy A Haupt
(74) *Attorney, Agent, or Firm* — Kim & Stewart LLP

(57) ABSTRACT

An image recognition system includes an imaging device and a processor. The processor is configured to detect an image of an article within an image captured by the imaging device, in response to detection of the image of the article, start a code detection process and an image recognition process to select one or more candidates. When the code symbol is detected within a predetermined period of time after the code detection process is started, the processor decodes the code symbol and determines an article associated with the decoded code symbol as the article within the captured image. When the code symbol is not detected within the predetermined period of time, and said one or more candidates are selected within the predetermined period of time, processor determines one of said one or more candidates as the article within the captured image.

6 Claims, 8 Drawing Sheets

(51) Int. Cl.
    *G07G 5/00*      (2006.01)
    *G06K 7/14*      (2006.01)
    *G06K 19/06*     (2006.01)
    *G06K 9/22*      (2006.01)
    *G06K 9/46*      (2006.01)
    *G06K 9/62*      (2006.01)

(52) U.S. Cl.
    CPC ............... *G06K 9/228* (2013.01); *G06K 9/46* (2013.01); *G06K 9/62* (2013.01); *G06K 19/06028* (2013.01); *G07G 1/0072* (2013.01); *G07G 5/00* (2013.01)

(56) References Cited

OTHER PUBLICATIONS

Jamie Shotton et al., "Semantic Texton Forests for Image Categorizaion and Segmentation", 8 pages.
Extended European Search Report dated Jan. 26, 2017 in corresponding European Patent Application No. 16185633.1 (European Publication No. 3144852), 7 pages.
Examination Report dated Jan. 2, 2018 in corresponding European Patent Application No. 16185633.1 (European Publication No. 3144852), 4 pages.
Notification of Reasons for Refusal dated Dec. 26, 2017 in corresponding Japanese Patent Application No. 2015-183052 with English translation, 6 pages.

* cited by examiner

IMAGE RECOGNITION SYSTEM THAT PERFORMS CODE DETECTION AND IMAGE RECOGNITION CONCURRENTLY

CROSS-REFERENCE TO RELATED APPLICATION

This application is based upon and claims the benefit of priority from Japanese Patent Application No. 2015-183052, filed Sep. 16, 2015, the entire contents of which are incorporated herein by reference.

FIELD

Embodiments described herein relate generally to an image recognition system, in particular, an image recognition system that performs code detection and image recognition concurrently.

BACKGROUND

There is a point-of-sale (POS) system having an object recognition function. Such a POS system performs a code reading process of reading a code symbol (bar code or the like) attached to an article to be purchased based on a captured image of the article and, if required, an object recognition process with respect to the article. Specifically, the POS system performs the code reading process, and the object recognition process if the code symbol is not obtained through the code reading process. That is, the object recognition process is started after the code reading process in response to a switching signal triggered by a cashier's operation, specifically pressing a switch button. As a result, when the object recognition process needs to be performed, it takes a long time to identify the article to be purchased. It would be desirable to shorten the time to identify the article even when the object recognition process is performed.

DETAILED DESCRIPTION

An embodiment provides an information processing apparatus and a program which are capable of reducing a time until an object recognition process to identify an article completes.

In general, according to an embodiment, an image recognition system includes an imaging device and a processor. The processor is configured to detect an image of an article within an image captured by the imaging device, in response to detection of the image of the article, start a code detection process to detect a code symbol within the image of the article and an image recognition process to select one or more candidates based on comparison between a feature value calculated from the image of the article and the feature value of each of a plurality of reference articles. When the code symbol is detected within a predetermined period of time after the code detection process is started, the processor decodes the code symbol and determines an article associated with the decoded code symbol as the article within the captured image. When the code symbol is not detected within the predetermined period of time, and said one or more candidates are selected within the predetermined period of time, processor determines one of said one or more candidates as the article within the captured image.

Hereinafter, an information processing apparatus and a program will be described in detail with reference to the accompanying drawings. In the following embodiments, a merchandise reading apparatus of a checkout system provided in a store such as a supermarket serves as the information processing apparatus and the program.

Figure 1:
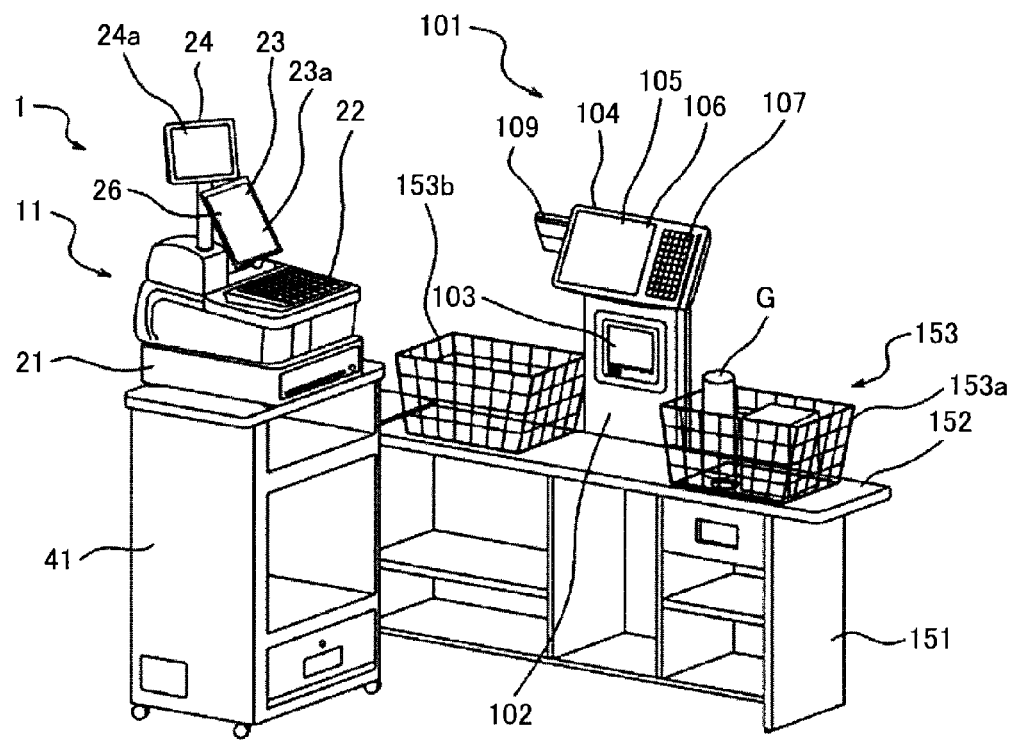
FIG. 1 is an external perspective view of a checkout system according to an embodiment.

FIG. 1 is an external perspective view of a checkout system 1. As illustrated in FIG. 1, the checkout system 1 includes a merchandise reading apparatus 101 that reads merchandise identification information of an article, and a POS terminal 11 that registers merchandise corresponding to the merchandise identification information read therefrom as the merchandise being purchased by a customer and performs a checkout process for the corresponding purchase transaction. Meanwhile, hereinafter, it is assumed that merchandise identification information is read code information or information (candidate merchandise information) which indicates candidate merchandise. The code read information is a merchandise code obtained by reading a merchandise code of an article or identification information based on a merchandise code. In addition, the candidate merchandise information is identification information such as an identification ID of candidate merchandise which is obtained through an object recognition process (described below).

In FIG. 1, the POS terminal 11 is mounted on a drawer 21 located on a register table 41. The POS terminal 11 includes a keyboard 22 having press-down keys for operation, arranged on an upper surface thereof. In addition, the POS terminal 11 includes a first display device 23, which is used for the input of a user (cashier) and a second display device 24, which is used for a customer's confirmation. The first and second display devices 23 and 24 are provided above the keyboard 22. The first display device 23 includes a display panel 23a such as a liquid crystal display and is a touch panel device including a touch panel 26 stacked on the display panel 23a. The second display device 24 includes a display panel 24a such as a liquid crystal display device. The second display device 24 is rotatably provided at an upper portion of the POS terminal 11. The drawer 21 accommodates currency bills, coins, and the like therein, and the inside of the drawer is opened under the control of the POS terminal 11.

A checkout table 151 forming an L shape together with the register table 41 is provided next to the register table 41. A merchandise receiving surface 152 on which a shopping basket 153 or the like is located is formed on the upper surface of the checkout table 151. In FIG. 1, a first shopping basket 153a and a second shopping basket 153b are shown as the shopping baskets 153. The first shopping basket 153a is brought by a customer. That is, the first shopping basket 153a includes an article (for example, an article G) that has not undergone reading of merchandise identification information. The second shopping basket 153b is used to place an article (for example, the article G in the first shopping basket 153a) for which the reading of merchandise identification information has been completed by the merchandise reading apparatus 101. The cashier picks up, for example, the article G that has not undergone the reading from the first shopping basket 153a, causes the merchandise identification information of the article G to be read by the merchandise reading apparatus 101, and then places the article G in the second shopping basket 153b.

The merchandise reading apparatus 101 is an information processing apparatus provided in the center portion of the merchandise receiving surface 152 of the checkout table 151 and is connected to the POS terminal 11 so as to be able to transmit and receive data in a wired or wireless manner. The merchandise reading apparatus 101 includes a reading unit 110 (see FIG. 2) including a reading window 103 on a front surface of a housing 102 so as to be exposed. The reading window 103 is formed of a transparent glass plate or the like. A display and operation unit 104 is provided at an upper portion of the housing 102. The display and operation unit 104 includes a third display device 106 such as a liquid crystal display, which is mainly used for a cashier's input. A screen of the third display device 106 includes a touch panel 105 stacked thereon, such that a touch input can be performed. In addition, a keyboard 107 is provided on the right of the third display device 106 so that a cashier's input can be performed therethrough. Further, a fourth display device 109, which is mainly used for a customer's confirmation, is provided on a back side of the display and operation unit 104.

The reading unit 110 includes an image capturing unit 164 (see FIG. 2) behind the reading window 103 for imaging an object such as a hand, an article, or a fixed structure. The cashier picks up, for example, the article G that has not undergone the reading from the first shopping basket 153a, and holds the article G near the reading window 103 to cause the article G be recognized before placing the article G in the second shopping basket 153b. The image capturing unit 164 images the article G held near the reading window 103 and generates data of one or more frame images. The reading unit 110 detects the article G based on the data of the frame images. Further, the reading unit 110 performs a code reading process of reading a code symbol, such as a bar code or QR Code®, attached to the article G and an object recognition process using a generic object recognition method described below, based on the frame images. Then, the reading unit 110 operates to determine the identity of the merchandise through one of the processes. When the reading unit 110 determines identity of the merchandise, the reading unit outputs merchandise information of the determined merchandise (merchandise or candidate merchandise corresponding to a merchandise code) to the display and operation unit 104. Thereafter, the reading unit 110 notifies the POS terminal 11 of merchandise identification information of the merchandise in order to perform merchandise registration of the determined merchandise as to be purchased merchandise.

The display and operation unit 104 displays a preset screen including numeric keys for inputting, for example, a merchandise key for selecting merchandise, the number of merchandise items, and the like, on the third display device 106, so that input can be performed on the screen. In addition, it is assumed that merchandise corresponding to the article that has undergone image capturing is determined based on the result of the code reading process or the object recognition process using the reading unit 110. In this case, the display and operation unit 104 displays merchandise information of the determined merchandise on the third display device 106.

The POS terminal 11 registers merchandise information such as merchandise classification, merchandise name, unit price, and any discount of the merchandise corresponding to the merchandise identification information, in a registration file (not shown) based on the merchandise identification information received from the merchandise reading apparatus 101, and then carries out a checkout process of the registered merchandise.

Figure 2:
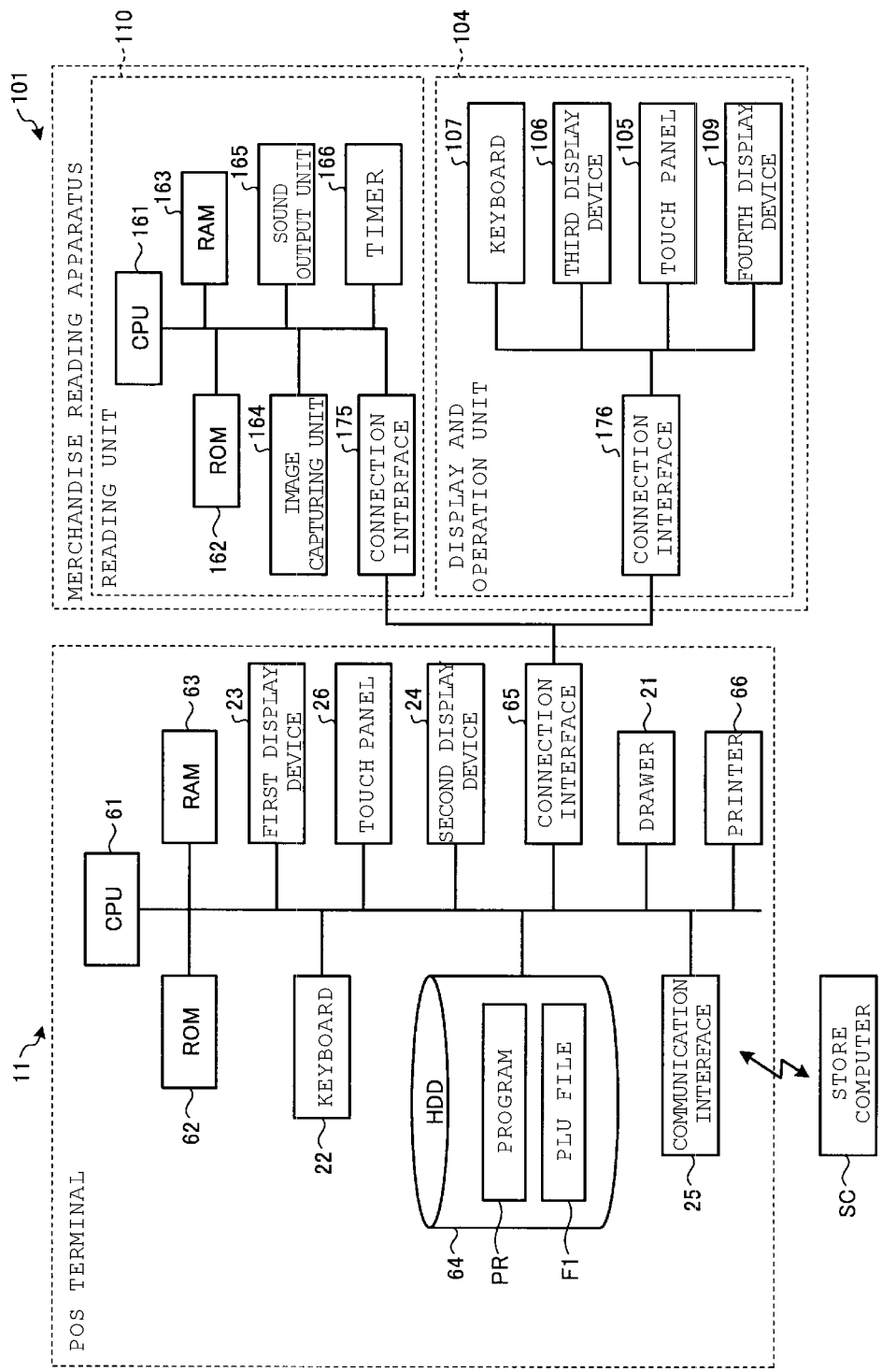
FIG. 2 is a block diagram illustrating a hardware configuration of a POS terminal and a merchandise reading apparatus of the checkout system.

FIG. 2 is a block diagram illustrating hardware configurations of the POS terminal 11 and the merchandise reading apparatus 101. The POS terminal 11 includes a central processing unit (CPU) 61, a read only memory (ROM) 62, a random access memory (RAM) 63, the first display device 23, the touch panel 26, the second display device 24, a keyboard 22, an HDD 64, the drawer 21, a printer 66, a communication interface 25, a connection interface 65, and the like. The CPU 61, the ROM 62, and the RAM 63 are connected to each other by a bus. In addition, each of the first display device 23, the touch panel 26, the second display device 24, the keyboard 22, the HDD 64, the drawer 21, the printer 66, the communication interface 25, and the connection interface 65 is connected to the bus through various input and output circuits (not shown in FIG. 2).

The CPU 61 is a central processing unit that performs overall control of the POS terminal 11. The ROM 62 is a non-volatile memory that stores a fixed program and the like. The RAM 63 is a volatile memory that is used as a working area by the CPU 61.

Various programs and various files are stored in the HDD 64. The various programs include a registration and checkout program PR for merchandise sales data processing, and the like. The various files include a PLU file F1 which is distributed from a store computer SC.

Merchandise information and feature data (feature value) of each article sold at a store are set in the PLU file F1 in association with each other. The merchandise information includes merchandise identification information such as a merchandise code, merchandise classification such as "vegetable", a merchandise name such as "carrot", and information such as a unit price or discount information. The feature data (feature value) indicate features of an article and are extracted in advance from data of a sample image of the article in accordance with a predetermined algorithm same as one employed for the object recognition process.

The communication interface 25 is a network card for performing data communication with a store computer SC, or the like. The store computer SC is arranged at a back office of a store, or the like. A PLU file F1 distributed to the POS terminal 11 is stored in an HDD (not shown) of the store computer SC.

The connection interface 65 is an interface that enables communication with the merchandise reading apparatus 101. The communication is performed in a wired or wireless manner. The printer 66 is a printing apparatus that prints transaction contents on a receipt or the like and discharges the receipt.

The merchandise reading apparatus 101 includes a CPU 161, a ROM 162, a RAM 163, an image capturing unit 164, a sound output unit 165, a timer 166, a connection interface 175, a connection interface 176, the touch panel 105, the third display device 106, a keyboard 107, the fourth display device 109, and the like. The CPU 161, the ROM 162, and the RAM 163 are connected to each other by a bus. In addition, all of the image capturing unit 164, the sound output unit 165, the timer 166, and the connection interface 175 are connected to the bus through various input and output circuits (not shown in FIG. 2). In addition, the connection interface 175 and the connection interface 176 are communicably connected to each other in a wired or wireless manner. Each of the touch panel 105, the third display device 106, the keyboard 107, and the fourth display device 109 is connected to the connection interface 176 through various input and output circuits (not shown in FIG. 2).

The CPU 161 is a central processing unit that performs overall control of the merchandise reading apparatus 101. The ROM 162 is a non-volatile memory that stores a control program and the like. The control program also includes a program for simultaneously starting the code reading process and the object recognition process or suspending output of a result obtained by the object recognition process, and the like. The RAM 163 is a volatile memory which is used as working area or the like by the CPU 161. A storage region of the RAM 163 is used for setting state flags of a "merchandise detection flag" and an "object recognition flag," which are described below in an operation flow.

The image capturing unit 164 is a color image sensor including an imaging element such as a charge coupled device (CCD) or a complementary metal oxide semiconductor (CMOS). The image capturing unit 164 starts imaging in accordance with an imaging turn-on signal received from the CPU 161, converts light (reflected light of an article) which is incident through the reading window 103 into an electrical signal at a predetermined frame rate (for example, 30 fps or the like), and sequentially outputs data of frame images.

The sound output unit 165 includes a reproduction circuit for reproducing a reading sound (e.g., beep sound), which is set in advance, an alarm sound, a speech sound, or the like, a speaker, and the like. The sound output unit 165 reproduces the reading sound, the alarm sound, the speech sound, or the like in accordance with a control signal received from the CPU 161 to notify a reading state or the like. The timer 166 starts clocking in response to a control signal from the CPU 161, and outputs a signal indicating termination of a priority period to the CPU 161 when a predetermined time (in this example, a time indicating the termination of the priority period) occurs.

Further, the connection interface 175 is connected to the CPU 161. The connection interface 175 is communicably connected to the connection interface 65 of the POS terminal 11, and enables data transmission and reception between the merchandise reading apparatus 101 and the POS terminal 11. In addition, the connection interface 175 is communicably connected to the connection interface 176, and transmits and receives data to and from the display and operation unit 104.

The connection interface 175 is an interface that enables communication between the POS terminal 11 and the display and operation unit 104 of the merchandise reading apparatus 101. The connection interface 176 enables communication between the POS terminal 11 and the reading unit 110 of the merchandise reading apparatus 101.

Next, functional blocks of the POS terminal 11 and the merchandise reading apparatus 101 will be described.

Figure 3:
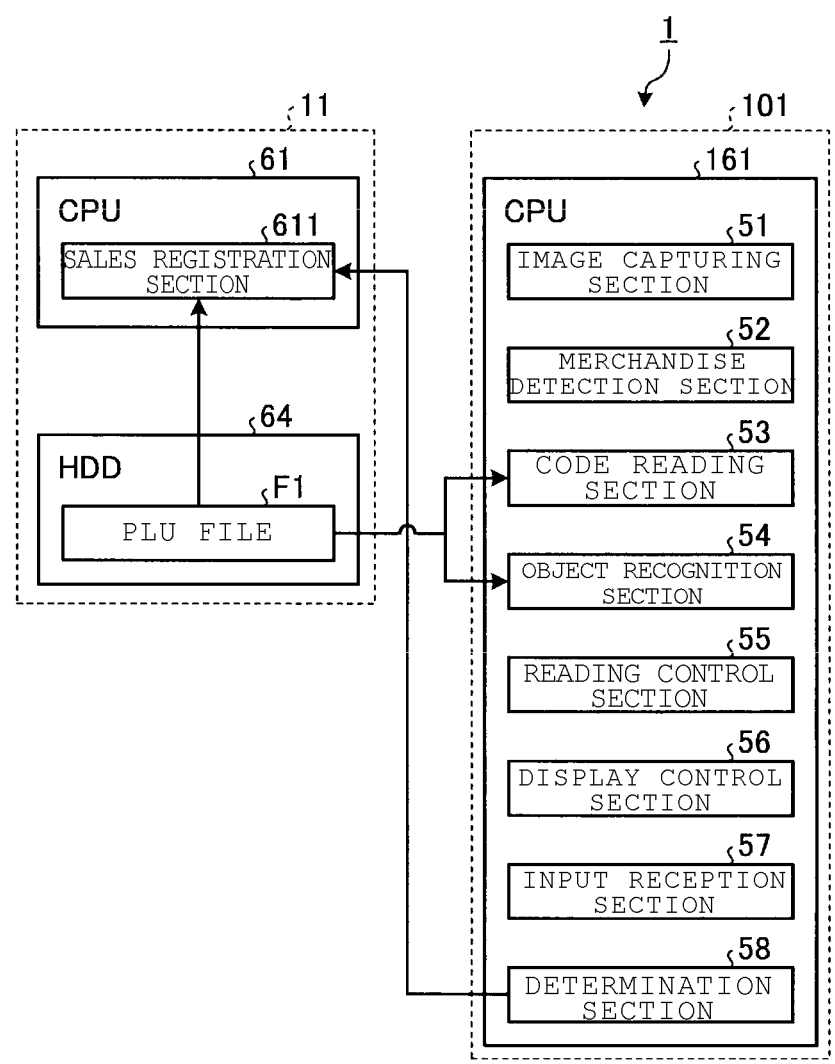
FIG. 3 is a block diagram illustrating functional sections of the POS terminal and the merchandise reading apparatus.

FIG. 3 is a block diagram illustrating functional sections of the POS terminal 11 and the merchandise reading apparatus 101. In the merchandise reading apparatus 101, the CPU 161 appropriately executes a program stored in the ROM 162 to generate functional sections such as an image capturing section 51, a merchandise detection section 52, a code reading section 53, an object recognition section 54, a reading control section 55, a display control section 56, an input reception section 57, and a determination section 58. In the POS terminal 11, the CPU 61 appropriately executes a program stored in the ROM 62 or the HDD 64 to generate a functional section such as a sales registration section 611.

The image capturing section 51 outputs an imaging turn-on signal to the image capturing unit 164 to cause the image capturing unit 164 to start an image capturing operation. The image capturing section 51 receives data of frame images which are output from the image capturing unit 164 after the imaging operation has started, and sequentially stores the data of the frame images in the RAM 163.

When the data of frame images are stored in the RAM 163 by the image capturing section 51, the merchandise detection section 52 detects that an article is being held near the reading window 103, based on a plurality of continuous frame images. Specifically, when data of a frame image is output from the image capturing unit 164, the merchandise detection section 52 reads out the output data of the frame image from the RAM 163 and compares the luminance of the frame image with the luminance of a frame image which was captured immediately previously. When there is a difference in luminance gradation between the luminances of the two consecutive frame images, the merchandise detection section 52 determines that reflection of something such as a hand or an article occurs in the frame image. Further, the merchandise detection section 52 binarizes data of a frame image which is contiguous to the frame image having the reflection to extract a contour line of the article. When the contour line of the contiguous frame image changes, the merchandise detection section 52 determines a region within the contour line as an article image of the article held near the reading window 103. In this manner, the merchandise detection section 52 detects that the article is held near the reading window 103.

Meanwhile, a method of specifying an article image is not limited to the one described above, and another method may be used. For example, the specification of an article image may be performed according to the presence or absence of a skin color region instead the contour line of the article in a frame image. When the skin color region is present, it is expected that there is a reflection of a cashier's hand. Accordingly, the contour line is extracted from the frame image, and the region image within the contour line, indicating the shape of the hand, at a position where the article is grasped by the hand is specified as the article image.

The code reading section 53 performs a code reading process (reading process) of reading a code symbol such as a bar code attached to an article or a two-dimensional code (e.g., a QR Code®) and outputs a decoded merchandise code. Specifically, the code reading section 53 reads out a frame image including the article from the RAM 163, and performs a code symbol decoding process on the frame image. When the code reading section 53 obtains a merchandise code in a predetermined format by the decoding process, the code reading section 53 collates the merchandise code with, for example, the PLU file F1. In addition, when the same merchandise code is present, the code reading section 53 outputs the merchandise code to the reading control section 55 as read code information.

The object recognition section 54 performs the object recognition process (extraction process) on an article image within the frame image to extract and output candidate merchandise (candidate merchandise information indicating candidate merchandise) of the article. Specifically, the object recognition section 54 reads out data of a frame image including an article image from the RAM 163, and calculate feature data of the article, which represent a surface state such as shades of the article or irregularities of the surface thereof from the article image. In addition, the object recognition section 54 collates the read feature data with feature data of each merchandise item registered in the PLU file F1, and selects candidate merchandise (candidate merchandise information) having a high degree of similarity. Thereafter, the object recognition section 54 outputs the selected candidate merchandise (candidate merchandise information) to the reading control section 55.

In this embodiment, the object recognition section 54 outputs candidate merchandise (candidate merchandise information) which has a similarity degree of similarity equal to or greater than a threshold value and has the highest degree of similarity among the selected candidate merchandise items (candidate merchandise information), to the reading control section 55. When all of the degrees of similarity of the selected candidate merchandise items (candidate merchandise information) are less than the threshold value, the object recognition section 54 does not perform output to the reading control section 55 on the assumption that object recognition cannot be performed successfully. In this case, the object recognition section 54 reads out data of a frame image, which was subsequently captured, from the RAM 163 and performs an object recognition process on an article image thereof.

For example, when feature data of each merchandise item within the PLU file F1 is set to satisfy the relation of 100%="the degree of similarity:1.0", the degree of similarity indicates the degree of similarity between feature data of an article image and the feature data of each merchandise item. The degree of similarity may be calculated by absolute evaluation or relative evaluation.

For example, assuming that the degree of similarity is calculated by absolute evaluation. In this case, the feature data of the article image is compared with feature data of an image of each item r type of registered merchandise stored in the PLU file F1, and the degree of similarity calculated as a result of the comparison is adopted as it is. Here, it is assumed that a degree of similarity of 95% is set as a threshold value. In this case, when registered merchandise items having a degree of similarity equal to or greater than 95% are present, the object recognition section 54 outputs information of a merchandise item having the highest degree of similarity among the registered merchandise items to the reading control section 55. On the other hand, when all of the registered merchandise items have a degree of similarity less than 95%, the object recognition section 54 does not perform output to the reading control section 55. In other words, the degree of similarity of merchandise is calculated again with respect to frame images that are subsequently captured on the assumption that object recognition cannot be performed successfully.

In addition, assume that the degree of similarity is calculated by relative evaluation. In this case, the calculation is performed so that the sum of degrees of similarity with respect to each of the registered merchandise item registered in the PLU file F1 is 1.0 (100%). For example, it is assumed that feature data of five registered merchandise items (first merchandise, second merchandise, third merchandise, fourth merchandise, and fifth merchandise) are registered in the PLU file F1. In this case, for example, the degree of similarity with respect to the first merchandise is set as "0.6", the degree of similarity with respect to the second merchandise is set as "0.1", the degree of similarity with respect to the third merchandise is set as "0.1", the degree of similarity with respect to the fourth merchandise is set as "0.1", the degree of similarity with respect to the fifth merchandise is set as "0.1", or the like, and the sum of the degrees of similarity is set as 1.0 at all times. Here, it is assumed that the degree of similarity of 0.5 is set as a threshold value. In this case, when a registered merchandise item having a degree of similarity equal to or greater than 0.5 is present, the object recognition section 54 outputs information of the registered merchandise item to the reading control section 55. On the other hand, when all of the registered merchandise items have a degree of similarity less than 0.5, the object recognition section 54 outputs nothing to the reading control section 55. In other words, the degree of similarity of merchandise is calculated again with respect to frame images that are subsequently captured, assuming that object recognition cannot be performed successfully.

Meanwhile, object recognition for recognizing an object included in an image is also called generic object recognition. Various recognition techniques of generic object recognition are explained in the following documents. Keiji Yanai, "The Current State and Future Directions on Generic Object Recognition", Journal of Information Processing Society, Vol. 48, No. SIG16 [searched on Aug. 10, 2010], Internet <URL:http://mm.cs.uec.ac.jp/IPSJ-TCVIM-Yanai.pdf> Jamie Shotton, etc., "Semantic Texton Forests for Image Categorization and Segmentation", [searched on Aug. 10, 2010], Internet <URL:http://citeseerx.ist.psu.edu/viewdoc/download?doi=10.1.1.145.3036&rep=rep1&type=pdf>

The reading control section 55 simultaneously starts the code reading process and the object recognition process. In addition, when a result of the object recognition process is obtained during a predetermined period of time (priority period) after the start thereof, the reading control section 55 temporarily suspends the output of the result and instead outputs a merchandise code read through the code reading process to the determination section 58. In addition, when a merchandise code is not obtained through the code reading process during the priority period, the reading control section 55 outputs the result of the object recognition process which is obtained during the priority period to the determination section 58 after the priority period. In addition, when the result of the object recognition process is also not obtained during the priority period, the reading control section 55 outputs information to the determination section 58 which is first obtained by the code reading process or the object recognition process after the priority period.

Here, a method of setting the priority period will be described. First, a code reading process of sample articles, each having a bar code attached thereto, is performed for each article, and an elapsed time until the completion of reading of the bar code is obtained for each article. In addition, an average elapsed time (or the latest time) until the completion of reading of the bar code is set in the timer 166 and is used for the reading control section 55 to detect whether or not the priority period has ended. Specifically, a value of approximately 300 msec to 500 msec is set when an imaging speed of the image capturing unit 164 is 30 fps. The set value is stored in the ROM 162 or the like in advance, so that the set value is set in the timer 166 during the start-up of the timer 166, or the like. Here, any value within a range between 300 msec and 500 msec may be set in the ROM 162 or the like. Alternatively, a predetermined number of frames may be stored in the ROM 162 or the like as information to set the priority period, so that the reading control section 55 can detect termination of the priority period based on the number of frames. For example, when the priority period is set as "500 msec", the number of frames equivalent to 500 msec is stored in the ROM 162.

The reading control section 55 monitors elapse of the predetermined time period based on output from the timer 166, and determines that the priority period ends when the predetermined time period has passed.

The display control section 56 displays various screens on the third display device 106. Specifically, the display control section 56 displays a preset screen including numeric keys for input, for example, the number of merchandise items, and the like and a merchandise key for selecting merchandise. In addition, the display control section 56 displays a screen indicating a result of the object recognition process, a screen indicating information regarding merchandise determined based on a result of the code reading process or the object recognition process, and the like.

The input reception section 57 receives various input operations through the touch panel 105 or the keyboard 107. For example, when an input screen is displayed on the third display device 106, a touch operation of the touch panel 105 and a press-down operation of the keyboard 107 are received as operation information.

The determination section 58 determines the merchandise corresponding to the merchandise code and candidate merchandise information output by the reading control section as purchased merchandise, and notifies the sales registration section 611 of the POS terminal 11 of merchandise identification information of the merchandise. The notification to the sales registration section 611 is made by the determination section 58 instructing the connection interface 175 to give notice to the sales registration section 611. As a result, the merchandise identification information is transmitted to the connection interface 65 from the connection interface 175, and the sales registration section 611 receives the merchandise identification information. Here, the merchandise identification information may be any information that enables the POS terminal 11 to identify the merchandise. For example, a merchandise code, a merchandise name, or the like can be used as the merchandise identification information.

The sales registration section 611 receives the merchandise identification information transmitted from the determination section 58, and registers merchandise corresponding to the merchandise identification information as the purchased merchandise. In addition, the sales registration section 611 performs a process of checking out merchandise items purchased in one transaction, which have been registered by that time, based on a closing input operation from, for example, the touch panel 26 or the like.

Next, the operation of the checkout system 1 will be described.

Figure 4:
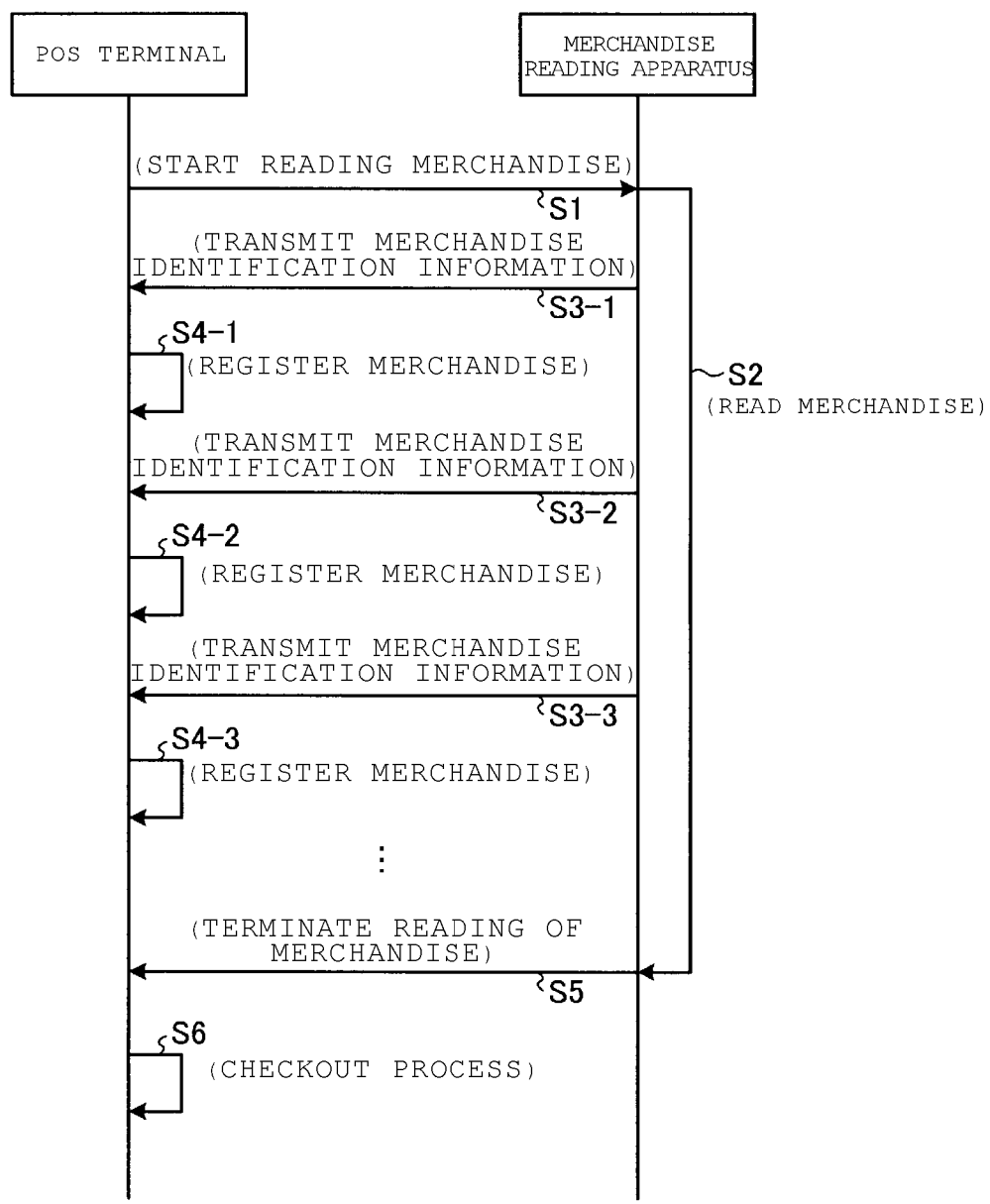
FIG. 4 is a sequence diagram illustrating a merchandise registration process and a checkout process carried out by the checkout system.

FIG. 4 is a flow chart illustrating an example of merchandise registration and checkout processes of one transaction, carried out by the checkout system 1. Hereinafter, the operation of the checkout system 1 will be described using the flow chart illustrated in FIG. 4 as an example.

First, the POS terminal 11 instructs the merchandise reading apparatus 101 to start a merchandise reading process (S1). For example, a cashier operates a predetermined key on the keyboard 22 or the touch panel 26 to instruct starting of the merchandise registration process. The POS terminal 11 transmits a reading start signal for instructing the merchandise reading apparatus 101 to start the merchandise reading process in response to the cashier's operation. In addition, the sales registration section 611 of the POS terminal 11 awaits the merchandise identification information which is notified to it as a result of the merchandise reading process or the like from the merchandise reading apparatus 101. The sales registration section 611 is generated by the CPU 61 executing a program related to the sales registration, which is stored in the ROM 62, the HDD 64, or the like.

When the merchandise reading apparatus 101 receives the reading start signal transmitted from the merchandise reading apparatus 101 in step S1, the merchandise reading apparatus performs the merchandise reading process (S2). Specifically, the merchandise reading apparatus 101 starts image capturing by the image capturing unit 164 (see FIG. 2), and receives data of a frame image in an imaging range including the reading window 103. Further, when the merchandise reading apparatus 101 detects an article held near the reading window 103 based on the data of the frame image, the merchandise reading apparatus simultaneously starts the code reading process and the object recognition process. When the merchandise reading apparatus 101 obtains a result of the object recognition process during the priority period, the merchandise reading apparatus 101 temporarily holds the result. In addition, when no result of the object recognition process is obtained during the priority period, the merchandise reading apparatus 101 determines a result of the object recognition process obtained during the priority period, as purchased merchandise after the priority period. Meanwhile, such a series of merchandise reading processes will be described below again using a flow chart illustrated in FIG. 5.

After the process of step S2 is performed, the merchandise reading apparatus 101 notifies the sales registration section 611 of the POS terminal 11 of the merchandise identification information of the merchandise determined in step S2 (S3-1).

Here, the merchandise reading apparatus 101 also receives a cashier's input of the merchandise identification information by selection of a merchandise key in parallel with the merchandise reading process. Specifically, the display control section 56 displays a preset screen on the third display device 106, and the input reception section 57 receives a cashier's operation of a merchandise key on the touch panel 105 or the keyboard 107. When the cashier operates the merchandise key, the merchandise reading apparatus 101 notifies the sales registration section 611 of the POS terminal 11 of merchandise identification information corresponding to the merchandise key.

Subsequently, the POS terminal 11 receives a notice of the merchandise identification information from the merchandise reading apparatus 101, and registers and processes the merchandise as purchased merchandise (S4-1). Specifically, the sales registration section 611 receives the above-described notification. In addition, the sales registration section 611 extracts merchandise information (a price, a discount, or the like) corresponding to the notified merchandise identification information from the PLU file F1. Further, the sales registration section 611 registers the extracted information in a registration file (not shown) or the like as sales merchandise.

Step S3-N and step S4-N are repeated until all of the sales merchandise items are read. Here, N is an integer of 2, 3, . . . .

Subsequently, the POS terminal 11 receives a reading termination signal indicating the termination of the merchandise reading process from the merchandise reading apparatus 101 (S5), and performs a checkout process of registered merchandise items for one transaction (S6). For example, the cashier presses down a closing key on the touch panel 105 or the keyboard 107 of the merchandise reading apparatus 101. Then, the reading termination signal is transmitted from the merchandise reading apparatus 101 and is received by the POS terminal 11 (S5). The POS terminal 11 extracts merchandise items purchased in one transaction registered in a registration file in response to the reading termination signal, and performs the checkout process such as the calculation of a total amount to be paid and an amount of change (S6).

Next, a specific example of the merchandise reading process shown in steps S2 and S3 in FIG. 4 will be described. The merchandise reading process is performed by the CPU 161 executing a program stored in the ROM 162, which generates as shown in FIG. 3 the image capturing section 51, the merchandise detection section 52, the code reading section 53, the object recognition section 54, the reading control section 55, the input reception section 57, and the determination section 58.

Figure 5:
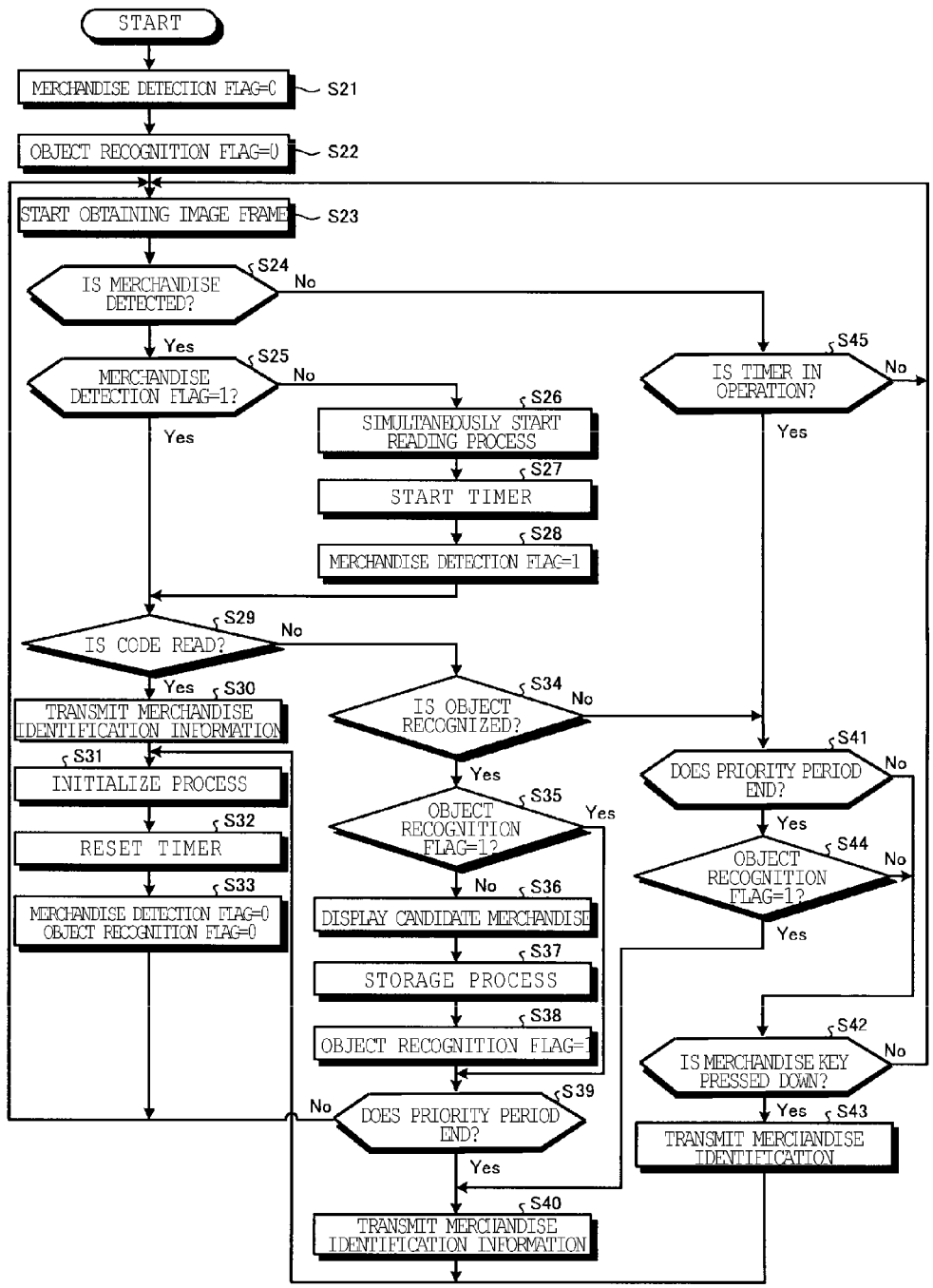
FIG. 5 is a flow chart illustrating a merchandise reading process.

FIG. 5 is a flow chart of the specific example of the merchandise reading process. In this example, the reading control section 55 secures flag regions of a "merchandise detection flag" and an "object recognition flag" in the RAM 163 and controls processing in accordance with the setting of the flags.

First, the reading control section 55 sets a default value of "0" in the "merchandise detection flag" and the "object recognition flag" of the RAM 163 (S21, S22).

Subsequently, the image capturing section 51 outputs an imaging turn-on signal to the image capturing unit 164 to obtain data of frame images from the image capturing unit 164, and the merchandise detection section 52 sorts out the data of frame images that include an image of an article (S23). During the sorting-out process, the merchandise detection section 52 obtains a difference in luminance gradation, for example, from a frame image which was obtained by the image capturing section 51 just before the frame image. When there is a difference in the luminance gradation, there is the possibility that each frame image includes the image of the article. Accordingly, in this case, the merchandise detection section 52 further extracts a contour line of an object from each frame image, and compares positions of the contour lines of the objects. A contour line of which the position changes is highly likely to be a contour line of the article. In this case, the merchandise detection section 52 selects the frame images obtained by the image capturing section 51 as frame images to be read.

Subsequently, the merchandise detection section 52 determines whether or not the article is held near the reading window 103, based on the frame images (S24). Here, when a frame image to be read is obtained by the sorting-out process of step S23, the merchandise detection section 52 determines that an article is held near the reading window 103 (step S24: determination result of Yes). On the other hand, when no frame image to be read is obtained in step S23, the merchandise detection section 52 determines that an article is not held near the reading window 103 (step S24: determination result of No).

Here, it is assumed that the determination result in step S24 is Yes. Then, the reading control section 55 reads the value of the "merchandise detection flag" of the RAM 163 and determines whether or not the value is set as "1" (S25). Since the merchandise detection flag is "0" in a first round, the determination result in step S25 is No. In a second round and the subsequent rounds, since the "merchandise detection flag" is set as "1" in step S28 of the first round, the determination result in step S25 is Yes until the "merchandise detection flag" is set to "0" in step S33.

Here, it is assumed that the determination result in step S25 is No. Then, the reading control section 55 instructs the code reading section 53 and the object recognition section 54 to be started up, and simultaneously starts the code reading process and the object recognition process (S26). As a result, the code reading section 53 and the object recognition section 54 simultaneously start performing the code reading process and the object recognition process, respectively, on the frame images selected as objects to be read in step S23, in parallel.

Further, the reading control section 55 starts the timer 166 for detecting end of the priority period (S27). Specifically, the reading control section 55 outputs a starting signal indicating the priority period (for example, 500 msec or the like) to the timer 166, to cause the priority period to be started and counted.

Then, the reading control section 55 changes the setting of the "merchandise detection flag" of the RAM 163 to "1" (S28), and proceeds to step S29.

Meanwhile, when the determination result in step S25 is Yes, the process proceeds to step S29, skipping steps S26 to S28.

Subsequently, the reading control section 55 determines whether or not a merchandise code is read by the code reading section 53 (S29). When a result of the code reading process returns from the code reading section 53, the reading control section 55 determines that the merchandise code is read by the code reading section 53 (step S29: determination result of Yes). In addition, when no result of the code reading process returns from the code reading section 53, it is determined that no merchandise code is read by the code reading section 53 (step S29: determination result of No). The determination result is No when the code reading process by the code reading section 53 is still being performed, when the code reading section 53 cannot still read the merchandise code because the bar code attached to the article is not included in the frame image, and when the code reading process itself cannot be performed because no bar code is attached to the article.

Here, it is assumed that the determination result in step S29 is Yes. Then, the determination section 58 notifies the POS terminal 11 (sales registration section 611) of merchandise identification information corresponding to the read merchandise code (S30). Specifically, when the merchandise code is returned from the code reading section 53, the reading control section 55 outputs the merchandise code to the determination section 58. The determination unit 58 notifies the sales registration section 611 of the merchandise code or other merchandise identification information corresponding to the merchandise code.

After the notification in step S30, the reading control section 55 initializes the code reading process and the object recognition process (S31). For example, the reading control section 55 gives an instruction to the code reading section 53 and the object recognition section 54 to initialize the code reading process and the object recognition process. In addition, the reading control section 55 clears the data of the frame image stored in the RAM 163, display information of candidate merchandise which is used for display in step S36, candidate merchandise (candidate merchandise information) which is stored in the RAM 163 in step S37, and the like. Details of steps S36 and S37 will be described below. Further, the reading control section 55 stops the timer 166 which was started in step S27 and resets the timer (S32). Then, the reading control section 55 returns the setting of the "merchandise detection flag" and the "object recognition flag" of the RAM 163 to a default value "0" (S33). Then, when step S33 is finished, the process proceeds to step S23. On the other hand, when the determination result in step S29 is No, the reading control section 55 performs the following process.

First, the reading control section 55 determines whether or not a result is obtained from the object recognition section 54 (S34). For example, it is assumed that information of the highest-ranked candidate merchandise having the degree of similarity exceeding a predetermined threshold value is returned to the reading control section 55 from the object recognition section 54. In this case, the reading control unit 55 determines that the result is obtained from the object recognition section 54 (step S34: determination result of Yes). On the other hand, when no result of the object recognition process is returned from the object recognition section 54, the reading control section 55 determines that no result is obtained from the object recognition section 54 (S34: determination result of No). Here, the determination result is No, when the object recognition process by the object recognition section 54 is still being performed, when the object recognition process cannot be performed for a reason such as insufficiency of the number of frame images to be read, and when none of degrees of similarity exceed the predetermined threshold value due to the wrong orientation of the article, or the like.

When the determination result in step S34 is Yes, the reading control section 55 reads the value of the "object recognition flag" in the RAM 163, and determines whether or not the "object recognition flag" is set as "1" (S35). Since the "object recognition flag" is "0" in the first round, the determination result in step S35 is No.

Here, it is assumed that the determination result in step S35 is No. Then, the reading control section 55 displays an image of candidate merchandise returned from the object recognition section 54, merchandise information, and the like on the third display device 106 (S36). Further, the reading control section 55 performs control of temporarily suspending the output of the candidate merchandise information, which is returned from the object recognition section 54, to the determination section 58, that is, determination as purchased merchandise (S37). Specifically, the reading control section 55 stores candidate merchandise information returned from the object recognition section 54 in the RAM 163. Then, the reading control section 55 suspends the output of the candidate merchandise information to the determination section 58 until the priority period ends, that is, until the timer 166 outputs a signal indicating time-up. Then, the reading control section 55 changes the setting of the object recognition flag of the RAM 163 from "0" to "1" (S38), and proceeds to step S39. Here, it is assumed that display information of step S36 and suspension information of step S37 are cleared from the RAM 163 during step S31.

On the other hand, when the determination result in step S35 is Yes, the process proceeds to step S39, skipping steps S36 to S38.

Subsequently, the reading control section 55 determines whether or not the priority period ends (S39). In this example, the reading control section 55 reads the output of the timer 166, and determines that the priority period ends when the signal indicating time-up is output from the timer 166 (step S39: determination result of Yes). When no signal indicating time-up is output from the timer 166, the reading control section 55 determines that the priority period is not terminated (step S39: determination result of No). When the determination result in step S39 is No, the process returns to step S23.

On the other hand, when the determination result in step S39 is Yes, the reading control section 55 outputs candidate merchandise information obtained through the object recognition process to the determination section 58, and notifies the sales registration section 611 of the merchandise identification information (S40). For example, the reading control section 55 reads out candidate merchandise information of which output to the determination section 58 is temporarily suspended, from the RAM 163, and outputs the read-out information to the determination section 58. If no candidate merchandise information is obtained during the priority period, the reading control section 55 outputs candidate merchandise information obtained in step S34 to the determination section 58. The determination section 58 automatically determines merchandise corresponding to the candidate merchandise information output from the reading control section 55 as purchased merchandise, and notifies the sales registration section 611 of merchandise identification information of the candidate merchandise. Then, the process proceeds to step S31.

If the determination result in step S34 is No, the reading control section 55 determines whether or not the priority period ends, similarly to step S39 (S41). Further, when the determination result in step S41 is No, the reading control section 55 determines whether or not a merchandise key is pressed down (S42). Here, when the merchandise key is determined to be pressed down (step S42: determination result of Yes), the determination section 58 notifies the sales registration section 611 of merchandise identification information corresponding to the merchandise key (S43). After step S43 is performed, the process proceeds to step S31. On the other hand, when the merchandise key is determined to be not pressed down (step S42: determination result of No), the process proceeds to step S23.

In addition, when the determination result in step S41 is Yes, the reading control section 55 reads the value of the "object recognition flag" in the RAM 163, similarly to step S35, and determines whether or not the "object recognition flag" is set as "1" (S44). When the determination result in step S34 is Yes at least once after the object recognition process is started in step S26, the "object recognition flag" should be set as "1". Accordingly, in this case, the determination result in step S44 is Yes, and the process proceeds to step S40. In other words, the reading control section 55 outputs candidate merchandise information of which output to the determination section 58 is temporarily suspended, to the determination section 58, and notifies the sales registration section 611 of the merchandise identification information. On the other hand, when the determination result in step S34 never becomes Yes, the "object recognition flag" remains "0". In this case, the determination result in step S44 is No, and the process proceeds to step S42.

If the determination result in step S24 is No, the reading control section 55 determines whether or not the timer 166 is in operation (S45). When the timer 166 is in operation (step S45: determination result of Yes), the process proceeds to step S41. When the timer 166 is stopped (step S45: determination result of No), the process proceeds to step S23.

If a merchandise code is obtained from the code reading section 53 during the priority period, the determination result in step S29 becomes Yes, and step S30 is performed. Thereby, the merchandise reading apparatus 101 transmits merchandise identification information based on the merchandise code to the POS terminal 11.

In addition, it is assumed that a result is obtained from the object recognition section 54 during the priority period, prior to a result from the code reading section 53. In this case, the determination result in step S34 is Yes, and the output of the result is temporarily suspended in step S37. Thereafter, when a merchandise code is obtained from the code reading section 53 during the priority period, the determination result in step S29 is Yes, and step S30 is performed. In other words, the merchandise reading apparatus 101 transmits merchandise identification information based on the merchandise code to the POS terminal 11. In this case, a result of which output is temporarily suspended in step S37 is canceled in step S31.

In another case, it is assumed that no merchandise code is obtained from the code reading section 53 during the priority period. In this case, when a result is obtained from the object recognition section 54 during the priority period, a result of in step S39 or step S41 which is the first determination process performed after the priority period is Yes, and step S40 is performed. In other words, the merchandise reading apparatus 101 transmits merchandise identification information, which is the result of which output is temporarily suspended in step S37, to the POS terminal 11.

In addition, in the case where no result is obtained from both the code reading section 53 and the object recognition section 54 during the priority period, the result of step S44 which is the first determination process performed after the priority period is No. In addition, loop processing of step S42 (determination result of No), steps S23 and S24 (determination result of Yes or determination result of No), S25 (determination result of Yes), S29 (determination result of No), S34 (determination result of No), S41 (determination result of Yes), and S44 (determination result of No) is repeated until the determination result in any of step S29, step S34, and step S42 is set as "Yes".

As described above, in the present embodiment, the merchandise reading apparatus 101 serving as an information processing apparatus includes the image capturing unit 164, the image capturing section 51, the merchandise detection section 52, the code reading section 53, the object recognition section 54, and the reading control section 55 and the determination section 58.

With such a configuration, the merchandise reading apparatus 101 simultaneously starts the code reading process and the object recognition process. In addition, even when a result of the object recognition process is obtained prior to a result of the code reading process during a priority period, the result of the object recognition process is suspended, and the result of the code reading process which is obtained later is applied as merchandise identification information indicating the article identity. When the result of the code reading process is not obtained during the priority period, the result of the object recognition process obtained during the priority period is applied as merchandise identification information indicating the article identity.

Thereby, after the code reading process, when a result is obtained in the meantime, a result of the object recognition process can be immediately acquired. In addition, even when no result is obtained in the meantime, as the object recognition process has been already started, the result of the object recognition process can be acquired earlier after the occurrence of the code reading process. Therefore, it is possible to reduce a time to acquire the result of the object recognition process for each article.

Modification Example

In the above embodiment, the object recognition section 54 outputs candidate merchandise (candidate merchandise information) which has a similarity degree equal to or greater than a threshold value and has the highest similarity degree among the extracted candidate merchandise (candidate merchandise information), to the reading control section 55, and the determination section 58 automatically determines the merchandise as purchased merchandise. Here, the object recognition section 54 outputs several of high-ranked candidate merchandise (candidate merchandise information) extracted to the reading control section 55, and the determination section 58 selects one of the high-ranked candidate merchandise (candidate merchandise information) in accordance with a cashier's input. Hereinafter, a description overlapping with the above embodiment will be appropriately omitted, and main features of the modification example will be described.

In a checkout system according to the modification example, when an object recognition section 54 (see FIG. 3) extracts a group of candidate merchandise (candidate merchandise information) through an object recognition process, the object recognition section 54 outputs a high-ranked group (for example, six pieces of high-ranked candidate merchandise information) to a reading control section 55 (see FIG. 3).

When the reading control section 55 acquires candidate merchandise information of the high-ranked group, the reading control section 55 suspends the output of the candidate merchandise information to a determination section 58 (see FIG. 3) until one of the high-ranked candidate merchandise (candidate merchandise information) selected by a cashier is acquired from an input reception section 57 (see FIG. 3). Accordingly, the reading control section 55 stores the candidate merchandise information of the high-ranked group in the RAM 163 in the meantime. In addition, when the reading control section 55 acquires the candidate merchandise information of the high-ranked group, the reading control section 55 instructs a display control section 56 (see FIG. 3) to display candidate merchandise of the high-ranked group. In addition, when the reading control section 55 acquires information indicating one candidate merchandise selected by the cashier from the input reception section 57, the reading control unit outputs candidate merchandise information in the RAM 163 which corresponds to the information to the determination section 58.

When the display control section 56 receives an instruction for displaying candidate merchandise of the high-ranked group from the reading control section 55, the display control section 56 generates display information of the candidate merchandise of the high-ranked group and outputs the generated information to a third display device 106 (see FIG. 2).

When the candidate merchandise of the high-ranked group are displayed on the third display device 106, the input reception section 57 receives a cashier's input of selecting one candidate merchandise among the group of the candidate merchandise.

When one candidate merchandise is selected by the cashier, the determination section 58 determines the selected merchandise as purchased merchandise.

Next, a reading control flow of the merchandise reading apparatus according to the modification example will be described.

Figure 6:
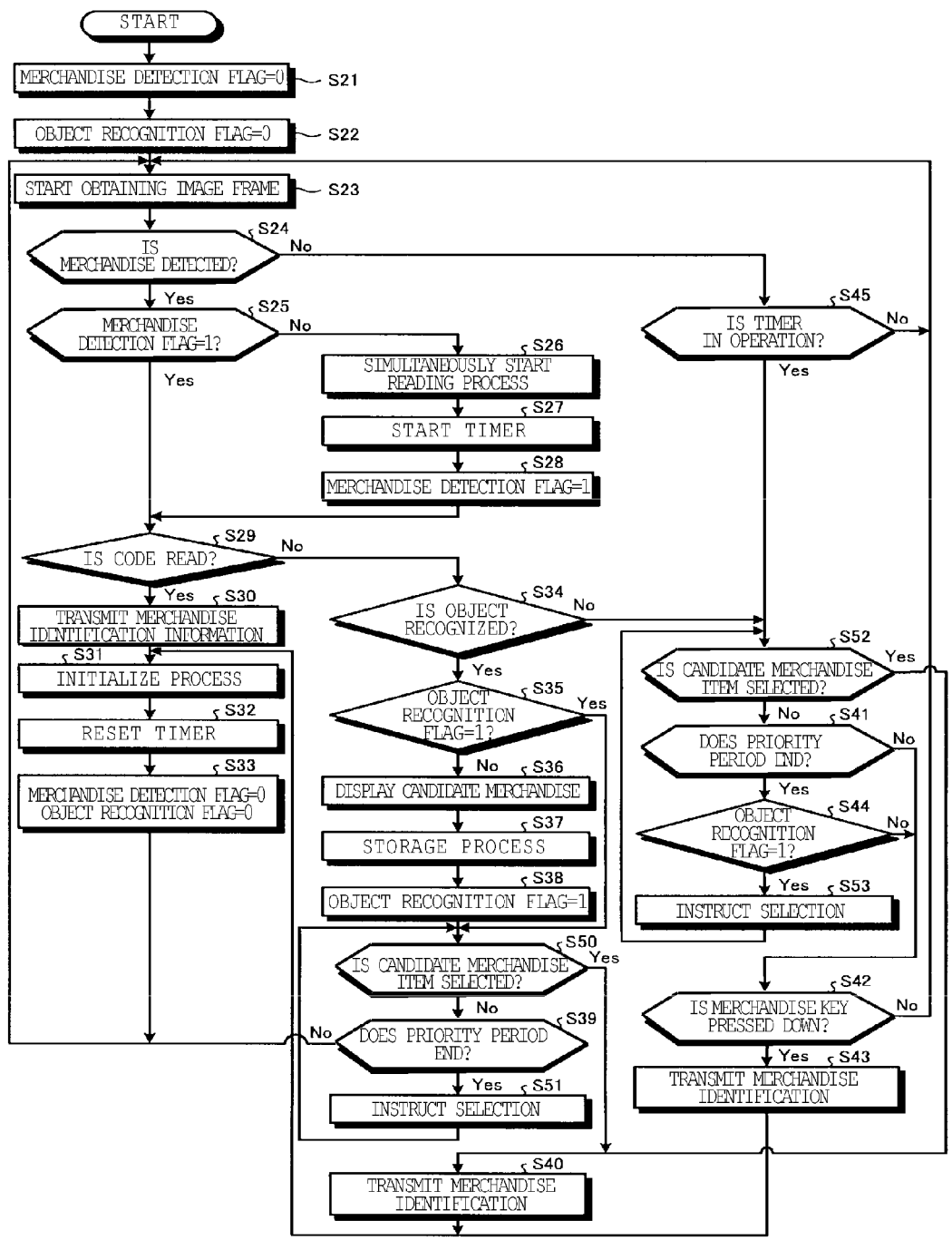
FIG. 6 is a flow chart illustrating a merchandise reading process according to a modification example.

FIG. 6 is a flow chart illustrating the reading control by the merchandise reading apparatus according to the modification example. In FIG. 6, a process of displaying candidate merchandise, a process of determining candidate merchandise, and the like are added to the flowchart (see FIG. 5) illustrating the reading control of the merchandise reading apparatus 101 according to the above embodiment. Hereinafter, differences from FIG. 5 will be described.

First, step S36 and steps thereafter will be described. In step S36, the reading control section 55 displays a selection screen of candidate merchandise (candidate merchandise information) of a high-ranked group, which is returned from the object recognition section 54, on the third display device 106. Specifically, the reading control section 55 instructs the display control section 56 to display the selection screen of the candidate merchandise of the high-ranked group. In addition, the display control section 56 generates display screen information including a selection key for the candidate merchandise of the high-ranked group and outputs the display screen information to the third display device 106. Thereby, the selection screen of the candidate merchandise of the high-ranked group is displayed on the third display device 106. Further, in step S37, the reading control section 55 temporarily stores the candidate merchandise information of the high-ranked group, which is returned from the object recognition section 54, in the RAM 163, and suspends output to the determination section 58. In step S38, the reading control section 55 changes the setting of an object recognition flag of the RAM 163 from "0" to "1".

Subsequently, the reading control section 55 determines whether or not one item of candidate merchandise is selected from the candidate merchandise of the high-ranked group (S50). Specifically, it is assumed that one item candidate merchandise is selected from the candidate merchandise of the high-ranked group displayed on the third display device 106, by a cashier's touching of the corresponding selection key, or the like. Then, the input reception section 57 receives the input of the selection key. The reading control section 55 acquires input information from the input reception section 57, and performs the determination on whether or not any candidate merchandise information of the high-ranked group stored in the RAM 163 is included in the input information, by comparison therebetween or the like.

Here, it is assumed that a cashier selects one item of candidate merchandise (step S50: determination result of Yes). In this case, the process proceeds to step S40, and the reading control section 55 outputs candidate merchandise information obtained through an object recognition process to the determination section 58. However, the candidate merchandise information output to the determination section 58 is only candidate merchandise information of one item of candidate merchandise selected by the cashier.

On the other hand, when the cashier does not select candidate merchandise (step S50: determination result of No), the reading control section 55 performs a process of determining the end of the priority period in step S39. When the priority period has not ended (step S39: determination result of No), the process proceeds to step S23. When the priority period ends (step S39: determination result of Yes), the reading control section 55 displays information indicating the end of the priority period on the selection screen of the third display device 106 (S51). Specifically, the reading control section 55 instructs the display control section 56 to display a screen for prompting a cashier to input a selection key. In addition, the display control section 56 generates display screen information of a screen formed by setting information for promoting the input of the selection key is set in the selection screen, and outputs the display screen information to the third display device 106. Regarding the information for promoting the input of the selection key, a message such as "please press down the selection key", a change of the selection key or a background screen to a predetermined color, or the blinking of the screen which are capable of being visually determined by the cashier may be appropriately set.

When step S51 ends, the process proceeds to step S50, and it is determined again whether or not one item of candidate merchandise is selected from the candidate merchandise of the high-ranked group. Loop processing in order of step S50 (determination result of No), step S39 (determination result of Yes), step S51, and step S50 is repeated until the cashier selects one candidate merchandise and the determination result in step S50 is set as "Yes".

Next, step S34 (determination result of No) and steps thereafter will be described. It is assumed that the reading control section 55 determines in step S34 that no result is obtained from the object recognition section 54 (step S34: determination result of No). Then, similarly to step S50, the reading control section 55 determines whether or not one item of candidate merchandise is selected from the candidate merchandise of the high-ranked group (S52). When the determination result in step S34 is Yes at least once after the object recognition process in step S26 is started, the candidate merchandise of the high-ranked group are displayed on the third display device 106. Accordingly, when the cashier touches the corresponding selection key, the determination result in step S52 is Yes. On the other hand, when the determination result in step S34 never becomes Yes, the candidate merchandise of the high-ranked group are not displayed on the third display device 106, and thus the determination result in step S52 is No.

When the determination result in step S52 is Yes, the process proceeds t step S40, and the reading control section 55 outputs candidate merchandise information obtained through the object recognition process to the determination section 58. However, the candidate merchandise information is output to the determination section 58 is only candidate merchandise information of one item of candidate merchandise selected by the cashier.

When the determination result in step S52 is No, the reading control section 55 performs a process of determining end of the priority period in step S41. When the priority period has not ended (step S41: determination result of No), the process proceeds to step S42. When the priority period ends (step S41: determination result of Yes), the reading control section 55 reads the value of the "object recognition flag" of the RAM 163 and determines whether or not the "object recognition flag" is set as "1" (S44).

Here, it is assumed that the determination result in step S44 is Yes. In this case, the reading control section 55 displays information for prompting a cashier to input a selection key on the selection screen of the third display device 106, similarly to step S51 (S53). When step S53 ends, the process proceeds to step S52, and the reading control section 55 determines again whether or not one item of candidate merchandise is selected from the candidate merchandise of the high-ranked group. Thereafter, loop processing in order of step S52 (determination result of No), step S41 (determination result of Yes), step S44 (determination result of Yes), step S53, and step S52 is repeated until the cashier selects one item of candidate merchandise and the determination result in step S52 becomes "Yes". On the other hand, when the determination result in step S44 is No, the process proceeds to step S42.

Meanwhile, even in a case of step S45 (determination result of Yes), the determination process of step S52 is performed.

In the modification example, when the priority period ends, information for promoting the selection of high-ranked candidate merchandise, which is extracted through an object recognition process, using the selection key on the display screen is visually displayed on the display screen. However, the method to prompt selection is not limited thereto, the selection may be promoted using an alarm sound, a speech sound, or the like. For example, when the priority period ends, a predetermined alarm sound (for example, "beep" or the like) or a speech sound such as "please select candidate merchandise from selection key" may be reproduced by the sound output unit 165.

As described above, in the modification example, when a result returns from the object recognition section 54, the reading control section 55 displays a selection key for candidate merchandise of a high-ranked group on a screen. When a cashier holds an article such as cabbage near the reading window 103, it is known that a bar code is not attached to the article in advance. Accordingly, in this case, it is possible to determine the item of candidate merchandise among high-ranked candidate merchandise as the article by the cashier selecting a selection key even when the priority period has not ended. In addition, after the priority period ends, switching to a screen for prompting the cashier to input a selection key is performed. For this reason, the cashier can visually recognize that the priority period ended and promptly input the selection key.

In this manner, according to the modification example, it is possible to complete a process of determining an article to be purchased from candidate merchandise obtained through an object recognition process, during a priority period.

In addition, in the above embodiment, other reading processes than the code reading process and the object recognition process may be carried out as well.

In addition, in the above embodiment and the modification example, the merchandise detection section 52 detects an article image in a frame image, to detect that an article is held near the reading window 103. However, an article being held near the reading window 103 may be detected using any of other detection units. For example, an article being held near the reading window 103 may be detected using an infrared sensor.

In addition, the value, approximately 300 msec to 500 msec, of the priority period is an example, and the value may be appropriately adjusted in accordance with a cashier' processing skill, specifications of an apparatus, the speed of an object recognition process, or the like. For example, in a case that a cashier has the skill to perform reading of bar codes rapidly, the priority period may be reduced. In contrast, in a case that the cashier does not have such skill, that is, performs the reading of bar codes slowly, the priority period may be increased.

In addition, a changing unit for changing the priority period may be provided. For example, a setting screen for setting the priority period may be provided as the changing unit, and the setting screen may be displayed on a display screen in accordance with a calling signal. When the priority period is set in a setting screen displayed by a cashier or the like, the setting information thereof is reflected on the priority period of the corresponding program.

In the above embodiment and the modification example, the information processing apparatus and program are applied to a checkout system in which the POS terminal and the reading apparatus are separately provided, but the configuration of the checkout system is not limited thereto. Such an information processing apparatus and program may be applied to, for example, a self POS that performs each of checkout, merchandise registration, and reading of merchandise identification information.

Figure 7:
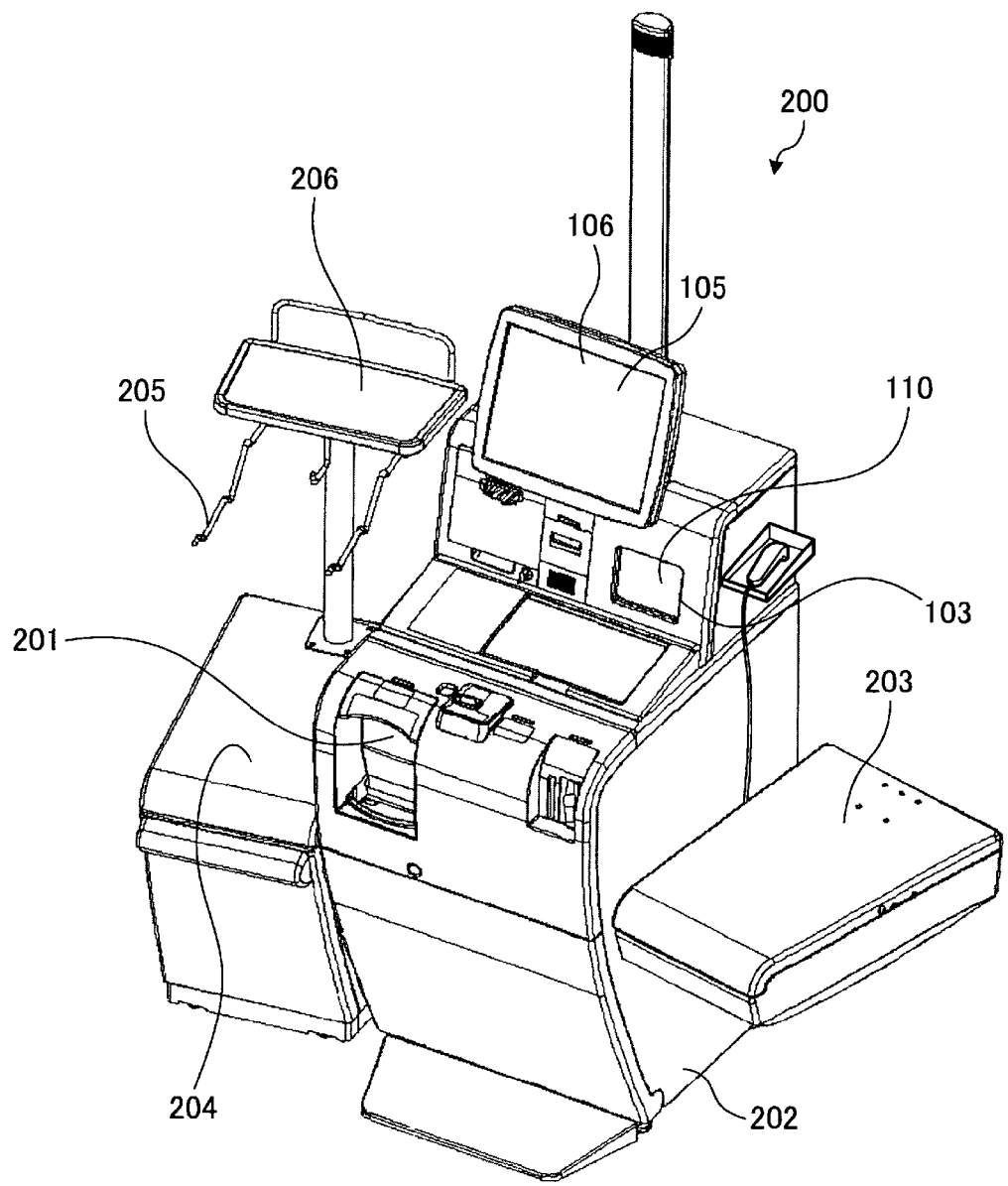
FIG. 7 is an external perspective view of a self POS.
Figure 8:
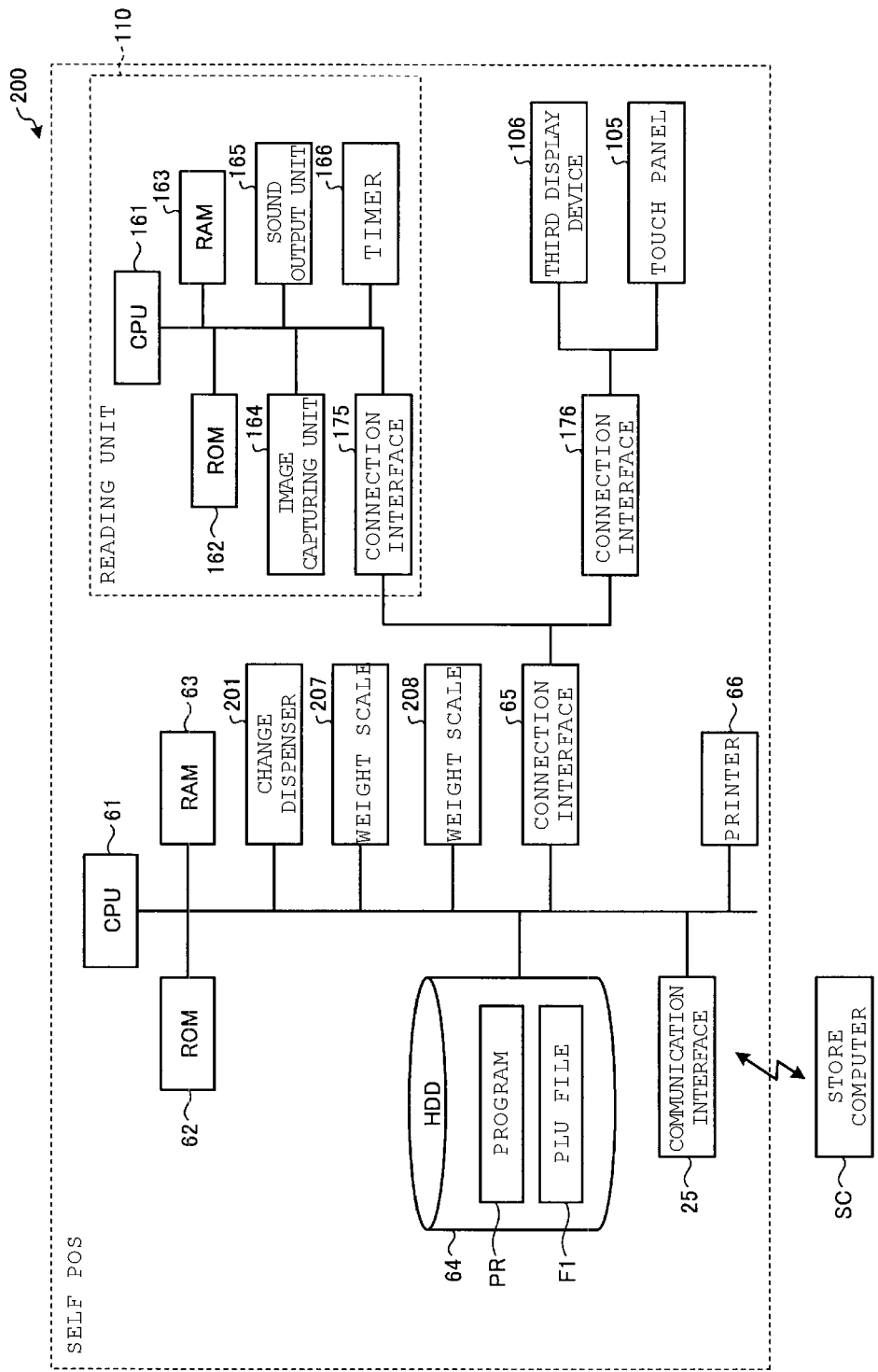
FIG. 8 is a block diagram illustrating a hardware configuration of the self POS.

Here, a configuration example of the self POS will be described. FIG. 7 is an external perspective view of a self POS 200. FIG. 8 is a block diagram illustrating a hardware configuration of the self POS 200.

Hereinafter, the same components as those illustrated in FIGS. 1 and 2 are denoted by the same reference numerals and signs, and a repeated description thereof will be omitted.

As illustrated in FIGS. 7 and 8, a main body 202 of the self POS 200 includes a third display device 106 having a touch panel 105 arranged on the front surface thereof, a reading unit 110 for reading a merchandise image, and the like. The third display device 106 displays a checkout screen and the like, in addition to the preset screen and the selection screen for candidate merchandise which are described in the above embodiment. In addition, the main body 202 includes a merchandise mounting table 203 on which a shopping basket 153a (see FIG. 1) containing non-scanned merchandise is placed, on the right thereof and includes a merchandise mounting table 204 on which scanned merchandise is placed, on the left thereof. The merchandise mounting table 204 includes a bag hook 205 to hang a bag for putting scanned merchandise, and a temporary placing table 206 to temporarily place scanned merchandise before putting it in a bag. The merchandise mounting tables 203 and 204 also serve as weight scales 207 and 208, respectively, and have a function of confirming that the weights of merchandise before and after checkout are the same as each other. Further, the main body 202 includes a change dispenser 201 and the like on the front surface thereof.

In the self POS 200, the CPU 161 appropriately executes a storage program of a ROM 162 to thereby serve as functional sections such as the image capturing section 51, the merchandise detection section 52, the code reading section 53, the object recognition section 54, the reading control section 55, the display control section 56, the input reception section 57, and the determination section 58 which are illustrated in FIG. 3. In addition, the CPU 61 appropriately executes a storage program of the ROM 62 or the HDD 64 to thereby serve as functional sections such as the sales registration section 611 illustrated in FIG. 3. When there is an input to start the merchandise registration process from the touch panel 105, an input signal is input to the CPU 61 through the connection interface 176 and the connection interface 65. The CPU 61 outputs a reading start signal to the reading unit 110 through the connection interface 65 and the connection interface 175 based on the input signal. The other operations of the self POS 200 can be substantially the same as those described in FIGS. 4 to 6. For that reason, the description of the operation will be omitted here.

Meanwhile, a predetermined program may be stored in the ROM 62 or the HDD 64, and the CPU 61 may operate to serve as some or all of the functional sections such as the image capturing section 51, the merchandise detection section 52, the code reading section 53, the object recognition section 54, the reading control section 55, the display control section 56, the input reception section 57, and determination section 58, in addition to the sales registration section 611. When the CPU 61 operates to serve as the reading control section 55, the determination section 58 is omitted, and the reading control section 55 directly outputs a merchandise code and merchandise identification information of candidate merchandise to the sales registration section 611 to perform merchandise registration.

Various programs used in information processing apparatuses according to the above embodiment and the modification thereof may be provided by being recorded in a computer-readable recording medium such as a CD-ROM, a flexible disk (FD), a CD-R, or a digital versatile disk (DVD) as files in an installable format or an executable format, and may be executed by being read by an HDD, a flash ROM, or the like of the information processing apparatus.

In addition, the programs may be stored in a computer connected to a network such as the Internet, and may be provided by being downloaded through a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image recognition apparatus, comprising:
   an input device;
   an imaging device; and
   a processor configured to
      set a time period during which a code detection process is to be carried out,
      detect an image of an article within an image captured by the imaging device,
      in response to detection of the image of the article, start the code detection process to detect a code symbol within the image of the article and an image recognition process to determine one or more article candidates based on comparison between a feature value calculated from the image of the article and a feature value of each of a plurality of reference articles,
      when an input selecting one of one of said article candidates is made through the input device during the set time period, determine the selected article candidate as the article within the captured image,
      when the code symbol is detected within the set time period after the code detection process and the image recognition process started and before the input selecting one of said article candidates is made through the input device, decode the code symbol and determine an article associated with the decoded code symbol as the article within the captured image, and
      when the code symbol is not detected within the set time period after the code detection process and the image recognition process started and before the input selecting one of said article candidated is made through the input device, determine one of said article candidates as the article within the captured image.

2. The image recognition apparatus according to claim 1, wherein
   when the code detection process is started, the processor starts to count time to detect passage of the set time period.

3. The image recognition apparatus according to claim 1, wherein
   one of said one or more article candidates that has a feature value that is most similar to the feature value calculated from the image of the article is determined as the article within the captured image.

4. The image recognition apparatus according to claim 1, further comprising:
   a display, and
   when the code symbol is not detected within the set time period the processor controls the display to display said one or more candidate articles.

5. The image recognition apparatus according to claim 4, wherein
   when the code symbol is not detected within the set time period, and said one or more article candidates are not selected within the set time period, the processor causes a visual or audio message to be generated to prompt the user selection.

6. The image recognition apparatus according to claim 4, wherein the processor is configured to control the display to display a setting screen for setting the time period during which the code detection process is to be carried out.

* * * * *